United States Patent [19]

Kitagawa et al.

[11] 4,439,929
[45] Apr. 3, 1984

[54] APPARATUS FOR DRYING A CERAMIC GREEN HONEYCOMB BODY

[75] Inventors: Jiro Kitagawa, Kasugai; Isao Mizutani, Nagoya, both of Japan

[73] Assignee: NGK Insulators, Ltd., Nagoya, Japan

[21] Appl. No.: 349,476

[22] Filed: Feb. 17, 1982

[30] Foreign Application Priority Data

Feb. 23, 1981 [JP] Japan ................................ 56-25121

[51] Int. Cl.³ ............................................. F26B 23/08
[52] U.S. Cl. ............................................. 34/1; 34/68
[58] Field of Search ..................... 34/1, 68; 219/10.67, 219/10.69, 10.81; 264/25, 26, 57, 58, 209.1; 425/174, 174.8, 174.8 R

[56] References Cited

U.S. PATENT DOCUMENTS

| 2,737,569 | 3/1956 | Brown et al. | 34/1 |
| 3,848,038 | 11/1974 | Dench | 264/26 |
| 3,899,326 | 8/1975 | Frost et al. | 264/57 |

FOREIGN PATENT DOCUMENTS

| 2817067 | 10/1979 | Fed. Rep. of Germany | 34/1 |
| 1033104 | 7/1953 | France | 34/1 |

Primary Examiner—Larry I. Schwartz
Assistant Examiner—David W. Westphal
Attorney, Agent, or Firm—Parkhurst & Oliff

[57] ABSTRACT

The disclosed apparatus is for drying a ceramic green honeycomb body by dielectric heating, which apparatus comprises a support board disposed between two electrodes for the dielectric heating, the support board having a tray-like metallic first part to support the ceramic green honeycomb body and a plate-like non-metallic second part to hold the first part.

18 Claims, 4 Drawing Figures

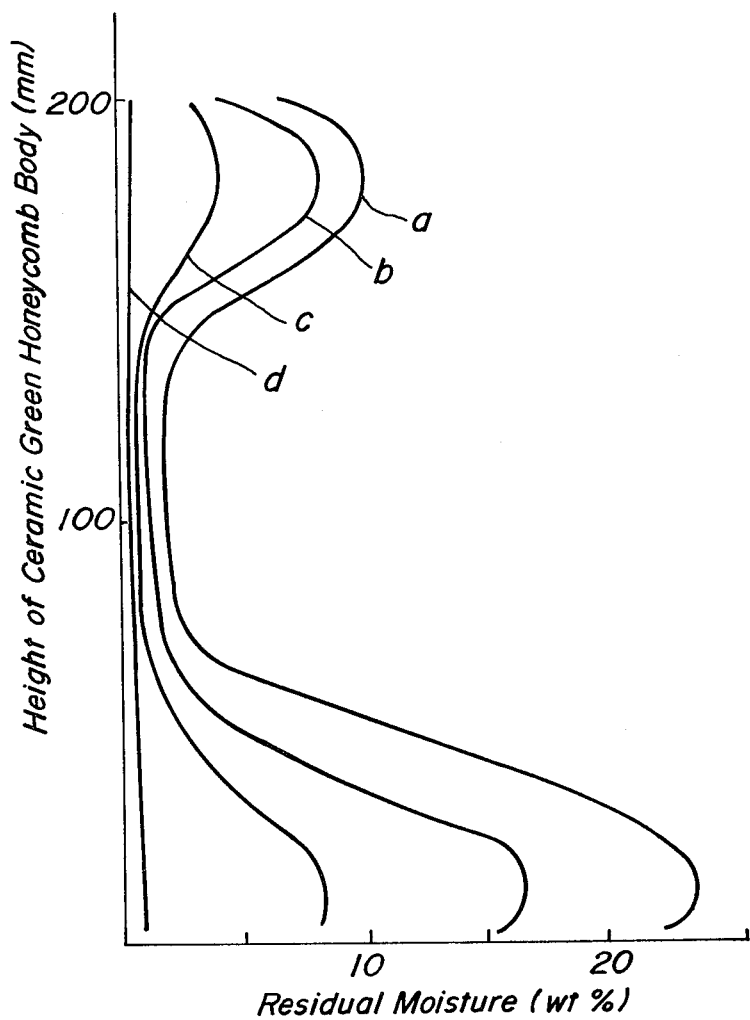
FIG_4

APPARATUS FOR DRYING A CERAMIC GREEN HONEYCOMB BODY

BACKGROUND OF THE INVENTION

1. Field of the Invention

This invention relates to an apparatus for drying a ceramic green honeycomb body.

2. Description of the Prior Art

A known procedure for forming a ceramic green honeycomb body by extruding the ceramic material body through a die. The thus formed ceramic green honeycomb body includes a plurality of parallel through holes separated from each other by partition walls of substantially uniform thickness. For instance, U.S. Pat. No. 3,824,196 discloses a die to be set on an extruder for extruding such ceramic green honeycomb bodies from a ceramic material body, which die has a configuration corresponding to the cross-sectional configuration of the ceramic green honeycomb body. In reference to the method of drying the thus extruded green honeycomb body, for instance, U.S. Pat. No. 3,954,672 discloses a dielectric drying process which applies high-frequency energy from a pair of facing electrodes to the ceramic green honeycomb body, whereby the ceramic green honeycomb body is dried by the heat generated therein through the dipole-dipole interaction in water due to the high-frequency energy.

However, the dielectric drying of the ceramic green honeycomb body according to the prior art has a shortcoming in that the density of electric lines of force is not uniform in the ceramic green honeycomb body and localized high-moisture zones are formed, and such high-moisture zones are found to be hard to eliminate either by elongating the duration of the dielectric heating or by increasing the high-frequency energy. When the ceramic green honeycomb body is placed on a non-metallic support board so that the through holes thereof are kept perpendicular to the support board during the dielectric heating, the above-mentioned high-moisture zones are formed in the proximities of the upper and lower ends of the green honeycomb body, as shown by the curve a of FIG. 4. After the ceramic green honeycomb body is dried, if such high-moisture zones are severed off from the thus dried green honeycomb body by using a grindstone, the through holes at the severed surface are apt to be plugged. The presence of the localized high-moisture zones tends to cause uneven shrinkage and cracks in the honeycomb body during firing.

To mitigate the above-mentioned difficulty in the severing of the high-moisture zones from the dried body, the severing may be effected after the firing. However, since the fired good is harder than the dried body, the severing after the firing has shortcomings in that much time and energy are necessary to complete the severing and that the grindstone for the severing is worn out quickly thus increasing the cost of the severing work.

SUMMARY OF THE INVENTION

Therefore, an object of the present invention is to obviate the above-mentioned shortcomings of the prior art.

Another object of the present invention is to shorten the time necessary for drying the ceramic green honeycomb body.

These and other objects have been attained by an apparatus for drying a ceramic green honeycomb body according to the present invention, which comprises two electrodes facing toward each other with a spacing therebetween, one of said electrodes being grounded; a dielectric heating energy source connected to said two electrodes; and a support board disposed in the proximity of said grounded electrode on the side of the other one of said electrodes, said support board having a tray-like metallic first part adapted to support said ceramic green honeycomb body and a plate-like non-metallic second part adapted to hold said first part, that surface of said first part which supports said ceramic green honeycomb body being larger than that section of said ceramic green honeycomb body which is in contact with said first part.

BRIEF DESCRIPTION OF THE DRAWINGS

For a better understanding of the invention, reference is made to the accompanying drawings, in which:

FIG. 4 is a graph showing the result of a series of tests relating to the effect of the present invention.

Throughout different views of the drawings, 1 is a support board, 2 is a tray-like metallic first part, 3 is a plate-like non-metallic second part, 4 is a hole, 5 is a ceramic green honeycomb body, 6 is a dielectric drier unit, 7 is a forced-wind drier unit, 8 is an electrode, 9 is a hot air circulating duct, 10 is a moisture exhaust duct, 11 is a dielectric drier conveyor, 12 is a forced-wind drier conveyor, 13 is a hot air intake opening, and 14 is a dielectric heating energy source.

DESCRIPTION OF THE PREFERRED EMBODIMENTS

Figure 1:
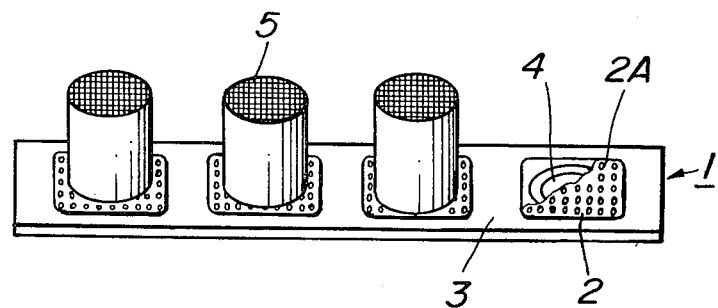
FIG. 1 is a partially cutaway schematic perspective view of a support board which is used in an apparatus according to the present invention.
Figure 2:
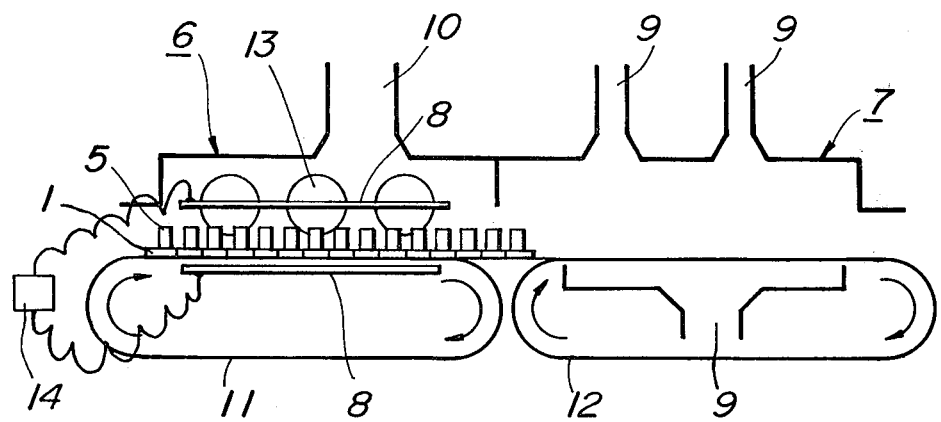
FIG. 2 is a diagrammatic illustration of an apparatus for drying a ceramic green honeycomb body according to the present invention.

One feature of the present invention is in a support board for supporting one or more ceramic green honeycomb bodies during the drying. Referring to FIG. 1 and FIG. 2, a support board 1 has one or more tray-like metallic first parts 2 such as perforated metallic trays and a plate-like non-metallic second part 3 such as a non-metallic plate. Each of the tray-like metallic first parts 2 has a supporting surface which is larger than that section of the ceramic green honeycomb body 5 which is in contact with the tray-like metallic first part 2, and a plurality of perforations are bored through the tray-like metallic first part 2. The plate-like non-metallic second part 3 has one or more holes 4 for holding one tray-like metallic first part 2 in each hole 4, and the hole 4 is larger than the above-mentioned section of the green honeycomb body 5 being supported by the tray-like metallic first part 2. The tray-like metallic first parts 2 are separated from each other by free areas on the plate-like non-metallic second part 3.

As shown in FIG. 2, a dielectric drier unit 6 receives the support board 1 which supports a plurality of ceramic green honeycomb bodies 5 in such a manner that each tray-like metallic first part 2 supports the perforated bottom surface of one honeycomb body 5. A dielectric drier conveyor 11 carries the support board 1 during the drying and conveys the support board 1 to a forced-wind drier conveyor 12 disposed adjacent to said dielectric drier conveyor 11. A forced-wind drier unit 7 is located next to the dielectric drier unit 6, and the forced-wind drier conveyor 12 is disposed in the forced-wind drier unit 7. Accordingly, in the illustrated embodiment, the ceramic green honeycomb bodies 5 are at first heated in the dielectric drier unit 6 and then continuously heated by hot wind in the forced-wind drier unit 7 for the purpose of complete drying thereof. The dielectric drier unit 6 has a pair of electrodes 8 disposed in parallel to each other with a spacing therebetween, and one electrode 8 is grounded. Preferably, the two electrodes 8 are disposed horizontally one above the other in the dielectric drier unit 6, and the dielectric drier conveyor 11 carries the support board 1 in the space between the two electrodes 8 at the proximity of the grounded electrode 8. In this case, through holes of each honeycomb body 5 are held vertically or at right angles to the electrodes 8 by means of the support board 1.

Hot air is blown into the dielectric drier unit 6 through hot air intake openings 13, so as to prevent the water vapour generated during the dielectric drying from condensating on the electrodes 8 or on the inner surface of the dielectric drier unit 6. The moisture in the dielectric drier unit 6 is extracted to the outside through a moisture exhaust duct 10. After dried by the dielectric drier unit 6, the green honeycomb body 5 may be further dried continuously by the forced-wind drier unit 7 so as to ensure complete drying which facilitates severing of the green honeycomb body 5 after the drying by a grindstone and eliminates the risk of cracks during the ensuring firing due to uneven shrinkage.

In the forced-wind drier unit 7, hot air from 80° C. to 150° C. is blown from the hot air circulating duct 9 toward the ceramic green honeycomb bodies 5 carried by the forced-wind drier conveyor 12 at a rate of 0.3 to 2.0 m/sec in such a manner that the hot air thus blown passes through the holes of the green honeycomb bodies 5. The moisture in the forced-wind drier unit 7 is extracted to the outside through a moisture exhaust duct 10. Thus, the embodiment of FIG. 2 carries out dielectric drying and the forced-wind drying in succession, but the present invention is not restricted to such successive two types of heatings.

Figure 3:
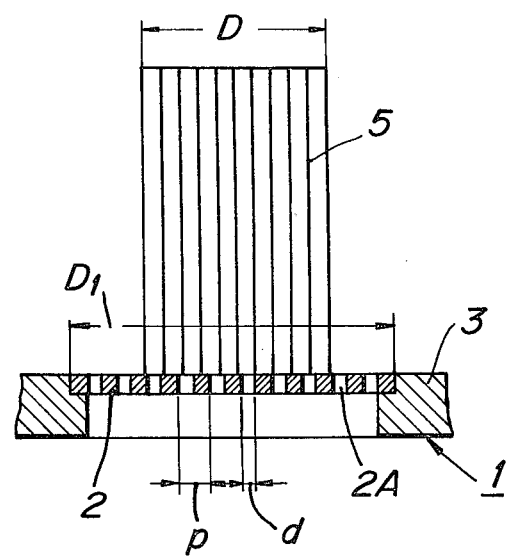
FIG. 3 is an explanatory view of a support board supporting a ceramic green honeycomb body.

FIG. 3 shows the details of an example of the support board 1 to be used in the apparatus according to the present invention. The tray-like metallic first part 2 of this example is a perforated aluminum disk, and the plate-like non-metallic second part 3 thereof is a wooden plate having through holes 4. Each hole 4 has an annular enlarged step-like portion where the perforated aluminum disk of the tray-like metallic first part 2 is fitted. When the ceramic green honeycomb body 5 has a cylindrical shape with an outside diameter D of 118 mm, the tray-like metallic first part 2 can be a perforated aluminum disk with an outside diameter $D_1$ of 146 mm, so that the tray-like metallic first part 2 is larger than that section of the ceramic green honeycomb body 5 which is in contact with the tray-like metallic first part 2 of the support board 1. More specifically, the area of the circular surface of the tray-like metallic first part 2 is 1.53 time the circular bottom surface of the green honeycomb body in the example of FIG. 3. The porosity of the tray-like metallic first part 2, or the ratio of the sum $S_H$ of the cross-sectional areas of all the perforations in the aluminum disk of the tray-like metallic first part 2 to the overall circular cross-sectional area $S_A$ of the aluminum disk of the tray-like metallic first part 2 including both the aluminum portions and the perforations, depends on the perforation diameter d and the perforation pitch p. In the example of FIG. 3, d=5.5 mm and p=7.0 mm, so that the porosity of the aluminum disk of the tray-like metallic first part 2 is 48.5%.

The above-mentioned support board 1 to be used in the present invention eliminates the generation of the localized high-moisture zones in the green honeycomb body 5 during the dielectric heating thereof. Accordingly, when the support board 1 of the invention is used, the dielectric drying alone is sufficient for drying the ceramic green honeycomb body 5 for certain applications without using the above-mentioned forced-wind drying. In the case of the dielectric drying alone, the holes 4 of FIG. 1 can be dispensed with from the support board 1.

The preferable material of the plate-like non-metallic second part 3 of the support board 1 is light and water-resisting substance, such as synthetic resin like plastic, asbestos, gypsum plaster boards, wooden plates, or the like. The tray-like metallic first part 2 of the support board 1 is preferably made of a metal with a high heat conductivity, such as aluminum, copper, aluminum alloys, copper alloys, or a suitable combination of such metals. When the tray-like metallic first part 2 is provided with electrically conductive means and used as an auxiliary electrode for improving the efficiency of the dielectric drying, the above-mentioned metallic materials must be used.

When the tray-like metallic first part 2 is disposed horizontally, the area of the top surface thereof must be larger than the horizontal cross-sectional area of the ceramic green honeycomb body 5 but less than 3.3 times, preferably less than 2.0 times, the above-mentioned horizontal cross-sectional area of the ceramic green honeycomb body 5. Here, what is meant by the horizontal cross-sectional area of the green honeycomb body 5 is the area surrounded by the outermost circumference of the horizontal cross section of the green honeycomb body 5. The reason for selecting the above-mentioned top surface area of the tray-like metallic first part 2 is in that the thus selected top surface area of the tray-like metallic first part 2 results in a high density of electric lines of force passing through the bottom surface of the ceramic green honeycomb body 5, which bottom surface has a plurality of holes, whereby the uniformity of the residual moisture distribution in the dried ceramic green honeycomb body 5 after the dielectric drying is considerably improved.

The individual perforations bored through the tray-like metallic first part 2 of the support board 1 can be of any arbitrary shape, such as circular, rectangular, slit-like, or the like. The porosity of the tray-like metallic first part 2 is preferably in a range of 20% to 90%, and more preferably in a range of 40% to 80%. If the porosity is less than 20%, the moisture generated during the dielectric drying from the proximity of the contact between the tray-like metallic first part 2 and the ceramic green honeycomb body 5 is not sufficiently vaporized out and tends to condensate on the surfaces of the green honeycomb body 5 and the support board 1 in the proximity of the contact therebetween. The condensation of the moisture causes insufficient drying at the lower end portion of the ceramic green honeycomb body 5. Besides, if the porosity is too low, then the forced-wind drying is applied after the dielectric drying for complete drying, the wind velocity in the ceramic green honeycomb body 5 becomes low, so that the desired complete drying cannot be achieved or a very long duration of the forced-wind drying becomes necessary.

One the other hand, if the porosity of the tray-like metallic first part 2 is larger than 90%, the rigidity of the tray-like metallic first part 2 of the support board 1 is so reduced that the tray-like metallic first part 2 tends to flex, and the ceramic green honeycomb body 5 tends to encroach into the thin walls of the perforations of the tray-like metallic first part 2 by gravity. Besides, when the forced-wind drying is applied after the dielectric drying in succession for complete drying, the excessively high porosity of the tray-like metallic first part 2 results in a very high wind velocity leading to a very high drying speed, whereby problems such as uneven shrinkage and drying cracks may be caused.

After the dielectric drying, if the forced-wind drying is effected for complete drying, the temperature of the air passing through the inside of the ceramic green honeycomb body 5 is kept 80 to 150° C., preferably 100 to 130° C. If the air temperature is lower than 80° C. in the forced-wind drying, the drying becomes insufficient. On the other hand, if the air temperature is higher than 150° C., binder in the ceramic green honeycomb body 5 is burnt out to deteriorate the mechanical strength of the dried ceramic green honeycomb body 5, and problems such as chipping of the dried green honeycomb body 5 during the severing by a grindstone may be caused.

The wind velocity through the inside of the ceramic green honeycomb body 5 during the forced-wind drying is preferably in a range of 0.3 to 2.0 m/sec. If the wind velocity is lower than 0.3 m/sec, the drying becomes insufficient or the duration of the forced-wind drying becomes too long, while if the wind velocity exceeds 2.0 m/sec, cracks may be caused by the too quick heating.

In the forced-wind drying unit 7, the function of the hot air circulating duct 9 is to force the wind through the holes of the ceramic green honeycomb body 5 so as to eliminate any localized high-moisture zones in the dielectrically dried ceramic green honeycomb body 5. Accordingly, the arrangement of the hot air circulating duct 9 is not restricted to what is illustrated in FIG. 2. For instance, if the ceramic green honeycomb body 5 is supported by the support board 1 in such a manner that the axial direction of the through holes of the ceramic green honeycomb body 5 is parallel to the plane of the support board 1, a suitable hot air circulating means may be provided so as to blow hot air in parallel to the support board 1.

It is also possible to effect the forced-wind drying simultaneously with the dielectric drying by providing a suitable hot air circulating means in the dielectric drying unit 6.

EXAMPLE

Extruded ceramic green honeycomb bodies 5 were prepared by using cordierite ceramic material. Such ceramic green honeycomb body 5 had an outside diameter D of 118 mm, a height H of 200 mm, and a porosity of 60%. Separately, support boards 1 of different constructions were prepared as shown in Table 1. All the ceramic green honeycomb bodies 5 were dried by heating for a certain period of time in a dielectric drier unit 6 with a rated output of 60 kW, and some of the ceramic green honeycomb bodies 5 were further heated in a forced-wind drier unit 7 under the conditions of an air temperature of 120° C. and a wind velocity of 1 m/sec.

The moisture contents of the thus dried ceramic green honeycomb bodies 5 were measured, and the rates of crack formation were determined by visual inspection. The result is shown in Table 2 and FIG. 4.

It can be concluded from the result of the examples that the present invention clearly obviates the shortcomings of the prior art; namely, the invention eliminates the risk of plugging of the through holes of the ceramic green honeycomb body at the time of severing by a grindstone which severing is necessitated by unevenness of the drying, prevents formation of cracks due to uneven shrinkage at the time of firing, and shortens the drying time.

In the present invention, various modifications of the above-mentioned examples are possible. For instance, the ceramic green honeycomb bodies may be made by using ceramic materials other than cordierite, such as mullite, silicon nitride, alumina, barium titanate series, and the like. The ceramic green honeycomb body may be formed not by extrusion but by corrugation of sheet members.

Although the invention has been described with a certain degree of particularity, it is understood that the present disclosure has been made only by way of example and numerous changes in details of construction and combination and arrangement of parts may be resorted to without departing from the scope of the invention as hereinafter claimed.

TABLE 1

| Support board No. | Material of support board | Top surface area of metallic disk (see Note 1) (cm$^2$) | Porosity of metallic disk (%) | Remarks |
| --- | --- | --- | --- | --- |
| 1 | Wood | — | — | Prior art |
| 2 | Wood and aluminum | 200 | 0 | The invention |
| 3 | Wood and aluminum | 200 | 48.5 | The invention |
| 4 | Asbestos and aluminum | 150 | 88.0 | The invention |
| 5 | Gypsum plaster board and brass | 250 | 25.0 | The invention |
| 6 | Plastic and copper | 300 | 35.0 | The invention |
| 7 | Wood and aluminum | 250 | 60.0 | The invention |
| 8 | Wood and aluminum | 350 | 75.0 | The invention |
| 9 | Wood and aluminum | 250 | 92.0 | The invention |

(Note: 1)
The metallic disk is the first part of the support board and the ceramic green honeycomb body is placed on the top surface of the metallic plate.

TABLE 2

| Support board No. | Drying method (see Note 1) | Rate of crack occurrence (%) | Residual moisture (%) Near contact with support board (%) | Curve of FIG. 4 |
| --- | --- | --- | --- | --- |
| 1 | DH | 95 | 23.0 | a |
| 2 | DH | 45 | 17.0 | b |
| 3 | DH | 12 | 9.0 | c |
|   | DH & BH | 2 | 1.0 | d |
| 4 | DH | 10 | 8.0 | similar to c |
| 5 | DH & BH | 3 | 1.5 | similar to d |
| 6 | DH | 15 | 10.0 | similar to c |
| 7 | DH & BH | 1 | 0.8 | similar to d |

TABLE 2-continued

| Support board No. | Drying method (see Note 1) | Rate of crack occurrence (%) | Residual moisture (%) Near contact with support board (%) | Curve of FIG. 4 |
|---|---|---|---|---|
| 8 | DH | 9 | 7.0 | similar to c |
| 9 | DH | 7 | 6.0 | similar to c |

(Note: 1)
DH: dielectric heating for dielectric drying
BH: blower heating for forced-wind drying

What is claimed is:

1. An apparatus for drying a ceramic green honeycomb body, comprising two electrodes facing toward each other with a spacing therebetween, one of the electrodes is grounded; a dielectric heating energy source is connected to the electrodes; and a support board is provided adjacent to the grounded electrode, between the two electrodes facing each other, the support board comprises a tray-like metallic first part designed to support the ceramic green honeycomb body and a plate-like non-metallic second part designed to hold the metallic first part, the tray-like metallic first part covering only a portion of the plate-like non-metallic second part, with the surface of the metallic first part being larger than that section of the ceramic green honeycomb body which is in contact with the metallic first part, the tray-like metallic first part is arranged so that it is isolated from any other tray-like metallic first parts by free areas on the support board so that during a drying operation a higher density of electric lines of force pass through the plate-like metallic first part than through the free areas.

2. The apparatus of claim 1, wherein that surface of the metallic first part which supports the ceramic green honeycomb body is not greater than 3.3 times than that section of the ceramic green honeycomb body which is in contact with the metallic first part.

3. The apparatus of claim 1, wherein the metallic first part comprises a metal selected from the group consisting of aluminum, copper, and alloys thereof.

4. The apparatus of claim 3, wherein the metallic first part is electrically connected to the grounded electrode.

5. The apparatus of claim 1, wherein a side surface of the ceramic green honeycomb body is in contact with the metallic first part.

6. The apparatus of claim 5, wherein the apparatus further comprises an air supply means for forcing the air to flow through the ceramic green honeycomb body so as to dry the green honeycomb body.

7. The apparatus of claim 6, wherein the apparatus further comprises a forced-wind drier unit disposed in series with a dielectric drier unit defined by the electrodes, the support board, and the dielectric heating energy source, the forced-wind drier unit having the air supply means disposed therein.

8. The apparatus of claim 1, wherein the tray-like metallic first part of the support board has perforations bored therethrough, the plate-like non-metallic second part has at least one opening therein which is covered by the tray-like metallic first part thus allowing the majority of perforations to communicate with the opening.

9. The apparatus of claim 8, wherein the ceramic green honeycomb body has through holes and the metallic first part supports the ceramic green honeycomb body in such a manner that the through holes of the ceramic green honeycomb body are in communication with the through holes of the metallic first part.

10. The apparatus of claim 9, wherein the apparatus further comprises an air supply means adapted to force air to flow through the ceramic green honeycomb body so as to dry the green honeycomb body.

11. The apparatus of claim 10, wherein the apparatus further comprises a forced-wind drier unit disposed in series with a dielectric drier unit defined by the electrodes, the support board, and the dielectric heating energy source, the forced-wind drier unit having the air supply means disposed therein.

12. The apparatus of claim 11, wherein the dielectric drier unit comprises a dielectric drier conveyor with means for carrying the support board between the two electrodes and the forced-wind drier unit comprises a forced-wind drier conveyor designed to carry the support board through the forced-wind drier unit.

13. The apparatus of claim 12, wherein the dielectric drier conveyor has means for transferring the support board to the forced-wind drier conveyor at the end of the conveyor belt extending between the two electrodes.

14. The apparatus of claim 2, wherein that surface of the metallic first part which supports the ceramic green honeycomb body is not greater than 3.3 times than that section of the ceramic green honeycomb body which is in contact with the metallic first part.

15. The apparatus of claim 2, wherein the metallic first part comprises a metal selected from the group consisting of aluminum, copper, and alloys thereof.

16. An apparatus for drying a ceramic green honeycomb body, comprising two electrodes facing toward each other with a spacing therebetween, one of the electrodes is grounded; a dielectric heating energy source is connected to the electrodes; and a support board is provided adjacent to the grounded electrode and between the two electrodes facing each other, the support board comprises a tray-like metallic first part designed to support the ceramic green honeycomb body and a plate-like non-metallic second part designed to hold the metallic first part, with the surface of the metallic first part being larger than that section of the ceramic green honeycomb body which is in contact with the metallic first part, the tray-like metallic first part covering only a portion of the plate-like non-metallic second part, the tray-like metallic first part is arranged so that it is isolated from any other tray-like metallic first parts by free areas on the support board so that during a drying operation a higher density of electric lines of force pass through the tray-like metallic first part than through the free areas; an air supply means for forcing air to flow through the ceramic green honeycomb body, wherein the metallic tray-like first part of the support board has perforations bored therethrough and the ceramic green honeycomb body has through holes, the plate-like non-metallic second part has at least one opening therein which is covered by the tray-like metallic first part, whereby the metallic first part supports the ceramic green honeycomb body in such a manner that the through holes of the ceramic green honeycomb body are in communication with the through holes of the metallic first part and the opening in the plate-like non-metallic second part so as to dry the green honeycomb body.

17. An apparatus for drying a ceramic green honeycomb body, comprising two electrodes facing toward each other with a spacing therebetween, one of the electrodes is grounded; a dielectric heating energy source is connected to the electrodes; and a support board is provided adjacent to the grounded electrode and between the two electrodes facing each other, the support board comprises a tray-like metallic first part designed to support the ceramic green honeycomb body, having perforations bored therethrough, and a plate-like non-metallic second part with at least one opening designed to hold the metallic first part over the opening so that the majority of the perforations communicate with the opening, with the surface of the metallic first part being larger than that section of the ceramic green honeycomb body and a side surface of the ceramic green honeycomb body which is in contact with the metallic first part, the tray-like metallic first part is arranged so that it is isolated from any other tray-like metallic first parts by free areas on the support board so that during a drying operation a higher density of electric lines of force pass through the tray-like metallic first part than through the free areas; an air supply means for forcing air to flow through the ceramic green honeycomb body so as to dry the green honeycomb body; a forced-wind drier unit disposed in series with a dielectric drier unit defined by electrodes, the support board, and the dielectric heating energy source, the forced-wind drier unit having the air supply means disposed therein; wherein said dielectric drier unit comprises a dielectric drier conveyor designed to carry the support board between the two electrodes; and the forced-wind drier unit comprises a forced-wind drier conveyor designed to carry the support board through the forced-wind drier unit.

18. The apparatus of claim 17, wherein the dielectric drier conveyor has means for transferring the support board to the forced-wind drier conveyor at the end of the conveyor belt extending the two electrodes.

* * * * *